(No Model.)　　　　　　　　　　　　　　　　　2 Sheets—Sheet 1.

J. CHRISTIE.
DIFFERENTIAL PULLEY BLOCK.

No. 317,728.　　　　　　　　　Patented May 12, 1885.

Witnesses:
Henry Bossert.
Harry Drury

Inventor:
James Christie
by his Attys.
Howson & Son (No Model.)
2 Sheets—Sheet 2.
J. CHRISTIE.
DIFFERENTIAL PULLEY BLOCK.
No. 317,728.
Patented May 12, 1885.
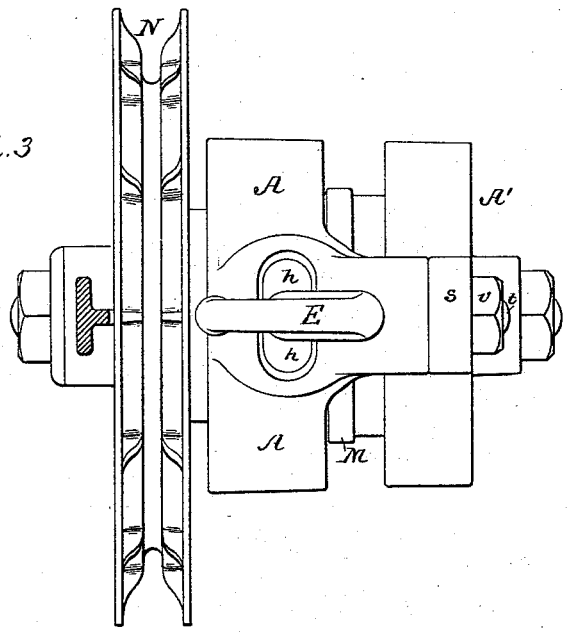
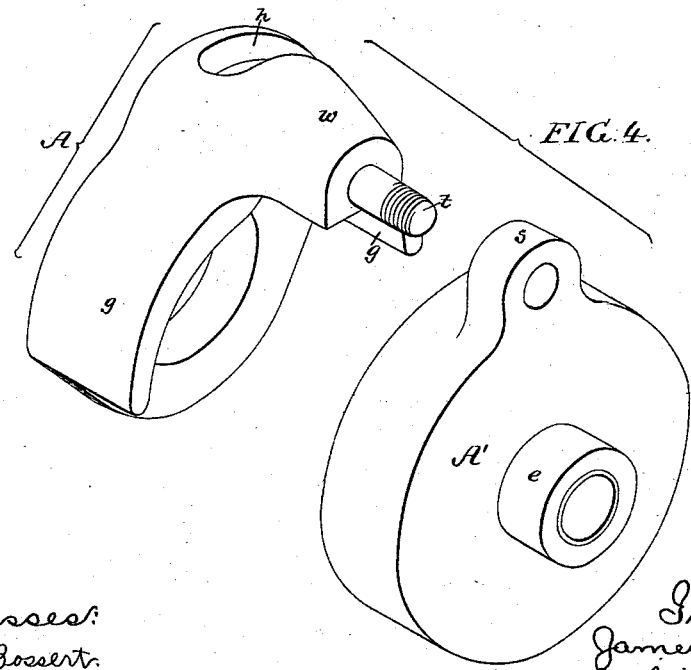
Witnesses:
Henry Bossert.
Harry Drury
Inventor:
James Christie
by his Attys.

UNITED STATES PATENT OFFICE.

JAMES CHRISTIE, OF PHILADELPHIA, PENNSYLVANIA, ASSIGNOR OF ONE-HALF TO PERCIVAL ROBERTS, OF SAME PLACE.

DIFFERENTIAL PULLEY-BLOCK.

SPECIFICATION forming part of Letters Patent No. 317,728, dated May 12, 1885.

Application filed December 26, 1884. (No model.)

*To all whom it may concern:*

Be it known that I, JAMES CHRISTIE, a citizen of the United States, residing in Philadelphia, Pennsylvania, have invented certain Improvements in Differential Pulley-Blocks, of which the following is a specification.

My invention consists of certain improvements fully described and claimed hereinafter in the construction of the differential pulley-block, for which application for patent, Serial No. 144,814, (allowed November 3, 1884,) was made by me October 6, 1884, the main object of my said improvements being simplicity and economy in construction.

Figure 1:
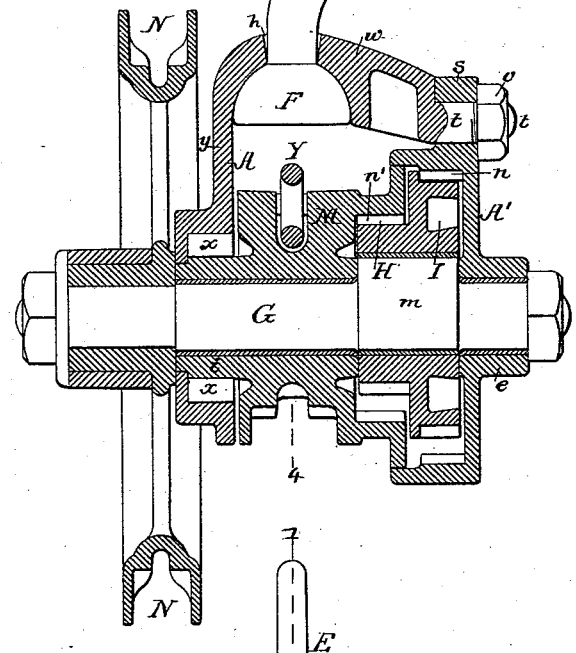
Figure 2:
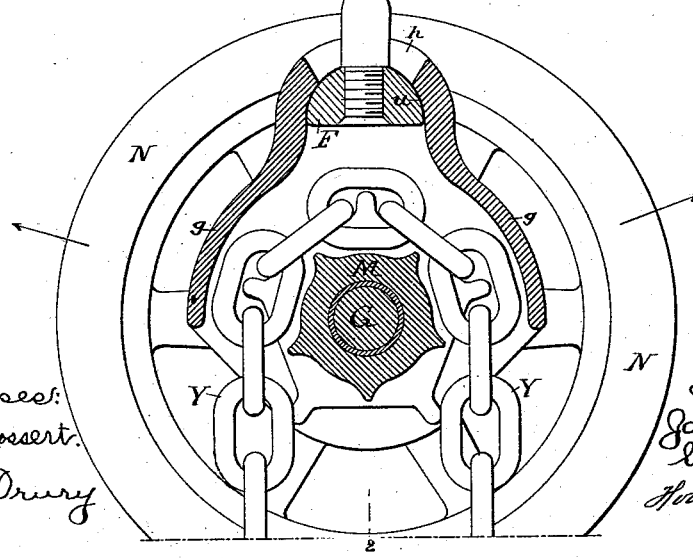

In the accompanying drawings, Figure 1, Sheet 1, is a vertical section, partly in elevation, of my improved differential pulley-block on the line 1 2, Fig. 2; Fig. 2, a transverse vertical section, also partly in elevation, on the line 3 4, Fig. 1; Fig. 3, Sheet 2, a plan view, and Fig. 4 a perspective view showing parts of the frame detached from each other.

The frame of the block consists of the two steel castings A A', the construction of which will be particularly described hereinafter.

A portion, $m$, of the shaft G is an eccentric, on which are two cog-wheels, H and I, cast in one piece, the latter wheel being larger in diameter and having more teeth than the former. The teeth of the wheel I gear into those of an internal wheel, $n$, forming part of the casting A', and the teeth of the wheel H gear into those of an internal wheel, $n'$, forming part of a chain-pulley, M. The shaft G has one bearing in a projection, $e$, of the casting A', the other bearing being in the chain-pulley M, and the hub $i$ of the latter having its bearing in the hub $e$ of the casting A, anti-friction rollers $x$ being preferably used in this bearing.

A chain-pulley, N, of large diameter, is secured to the shaft G, and round this pulley passes an endless chain, by manipulating which the shaft may be turned, and the chain-pulley M rotated through the medium of the gearing described, the wheels H and I being also loose on the shaft.

The manner in which the gearing operates to rotate the pulley N at a much less speed than the shaft, and consequently causes the pulley to act on the hoisting-chain Y with much more power than that exerted to drive the shaft, will be understood by those skilled in the art, as the system of differential gearing constitutes a well-known mechanical movement which has heretofore been applied to many different mechanisms, and, among others, to pulley-blocks.

The foregoing description will apply to the pulley-block which formed the subject of an application for a patent filed by me October 6, 1884, Serial No. 144,814, allowed November 3, 1884, my present improvement relating to the frame and the manner of connecting the hook thereto. In the pulley-block described in the said application the frame consisted of three parts—namely, two opposite side plates, and a top plate, to which the hook was riveted.

The casting A includes the top $w$ and side plate, $y$, the other casting, A', of the frame consisting of the circular plate shown most clearly in Fig. 4. While these castings may be secured to each other by an ordinary bolt or screws, I prefer to make a projection, $t$, part of the casting A, the said projection passing through a lug, $s$, on the casting A', and being threaded for the reception of a nut, $v$. This plan of constructing the frame is more economical and simple than that described in my said application, and is more substantial.

Another feature of the frame is the making of flanges $g$ $g$, shown in Figs. 2 and 4, part of the casting, these flanges, while adding to the strength of this part of the frame, serving as a hood for maintaining the chain Y in its proper position on the chain-pulley M.

Another feature of my present improvements is the manner of connecting the hook E to the frame. It is advisable that the pulley-block should be at liberty to be moved independently of the hook to and fro in the direction pointed out by the arrows in Fig. 2, and for this reason the opening $h$, made in the top of the frame for the shank of the hook, is elongated, and a concave socket, $u$, is made in the under side of the top of the frame for the convex portion of the nut F, which is screwed and riveted to the shank of the hook. The said opening $h$ should also be wide enough to permit the pulley-block to have a limited play laterally independently of the hook.

Disclaiming the differential gearing consisting of the shaft and its eccentric and the several wheels, I claim as my invention—

1. The combination of a pulley-block of differential gearing, substantially as described, with frames consisting of a casting, A′, and the casting A, the latter including the top $w$ and side plate, $y$, substantially as set forth.

2. The combination of the casting A, including the side plate, $y$, the top plate, $w$, and threaded projection $v$, with the casting A′, substantially as specified.

3. The combination of the frame of a pulley-block, its concave socket, and the elongated opening $h$, with the hook and its concave nut adapted to the socket, substantially as described.

4. The combination of the chain-pulley M of the differential gearing with castings A A′, and the flanges $g\,g$, which are parts of the casting A, and form a hood for the said chain-wheel, substantially as set forth.

In testimony whereof I have signed my name to this specification in the presence of two subscribing witnesses.

JAMES CHRISTIE.

Witnesses:
HARRY SMITH,
HENRY HOWSON, Jr.